(12) United States Patent
Lee (10) Patent No.: US 7,551,160 B2
(45) Date of Patent: Jun. 23, 2009

(54) TOUCH PAD APPARATUS FOR A PORTABLE COMPUTER

(75) Inventor: Jun-Hyung Lee, Osan (KR)

(73) Assignee: LG Electronics Inc., Seoul (KR)

( * ) Notice: Subject to any disclaimer, the term of this patent is extended or adjusted under 35 U.S.C. 154(b) by 854 days.

(21) Appl. No.: 11/044,725

(22) Filed: Jan. 28, 2005

(65) Prior Publication Data

US 2006/0022957 A1    Feb. 2, 2006

(30) Foreign Application Priority Data

Jul. 29, 2004    (KR) ................ 10-2004-0059870

(51) Int. Cl.
*G09G 5/00* (2006.01)
(52) U.S. Cl. ............... 345/156; 345/173; 345/174; 345/175; 345/179
(58) Field of Classification Search ............ 345/156, 345/173–175, 179
See application file for complete search history.

(56) References Cited

U.S. PATENT DOCUMENTS 6,380,930 B1 * 4/2002 Van Ruymbeke ........... 345/173

FOREIGN PATENT DOCUMENTS

| CN | 1347524 A | | 5/2002 |
|----|-----------|---|--------|
| CN | 1395152 A | | 2/2003 |
| CN | 13955152 | * | 2/2003 |
| CN | 1403890 | * | 3/2003 |
| CN | 1403890 A | | 3/2003 |
| GB | WO 03/009219 A2 | * | 1/2003 |
| JP | 2001-184986 | * | 7/2001 |
| JP | 2001/184986 A | | 7/2001 |
| WO | WO 03/009219 A2 | | 1/2003 |

OTHER PUBLICATIONS

Chinese Office Action dated Sep. 1, 2006.

* cited by examiner

*Primary Examiner*—Richard Hjerpe
*Assistant Examiner*—Leonid Shapiro
(74) *Attorney, Agent, or Firm*—KED & Associates, LLP (57) ABSTRACT

A touch pad apparatus for a portable computer is provided. The touch pad apparatus includes a keyboard deck with a pad vent hole formed therethrough, a touch pad exposed through the pad vent hole, the touch pad receiving a signal from a user, a shield plate fastened to a bottom surface of the keyboard deck thus fixing the touch pad to the keyboard deck, the shield plate having a vent hole configured to be positioned beneath the touch pad, and a pad substrate fastened to the bottom surface of the keyboard deck, the pad substrate having a vent hole configured to be positioned beneath the touch pad and being provided with an element for operating the touch pad. Since the touch pad apparatus for the portable computer is light, slim, simple, and compact, it is possible to minimize a space for installation and to diversify functions of the portable computer. It is also easy to install the touch pad apparatus.

27 Claims, 5 Drawing Sheets

TOUCH PAD APPARATUS FOR A PORTABLE COMPUTER

BACKGROUND OF THE INVENTION

1. Field of the Invention

The invention relates to a portable computer, and more particularly, to a touch pad apparatus for use as an input device in a portable computer

2. Background of the Related Art

Figure 1:
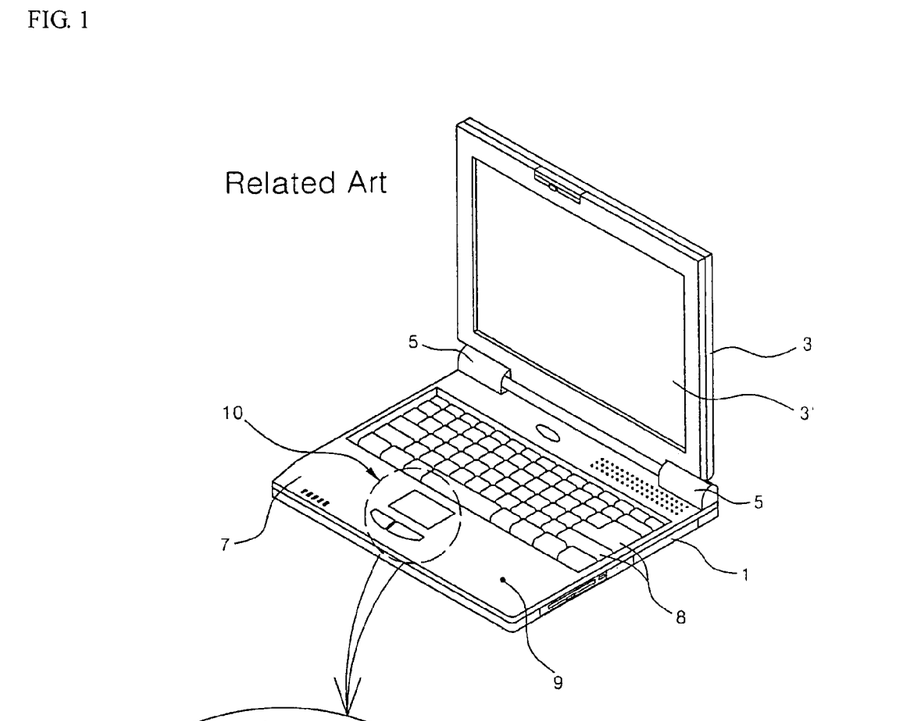
FIG. 1 is an exploded perspective view of a related art portable computer.

A touch pad apparatus or a pointing stick is used as a pointing device which may be used instead of a mouse when a portable computer, such as a notebook computer, is transported. FIG. 1 shows a portable computer which is provided with a conventional touch pad apparatus.

As shown in FIG. 1, a related portable computer generally comprises a main body 1 and a display 3. The display 3 is connected to both rear side edges of the main body 1 by hinges 5. Thus, the display 3 may be seated on an upper surface of the main body 1 or unfolded at a predetermined angle, as shown in FIG. 1. The display 3 is provided with a display screen 3,' such as a liquid crystal display panel.

The upper surface of the main body 1 is defined by a keydeck 7. A plurality of keys 8 are arranged in the keydeck 7. A plurality of the keys 8 are arranged in several rows on the upper surface of the main body 1. A front end of an upper surface of the keydeck 7 defines an armrest 9 on which user's hands are seated when the user types with the keys 8. A touch pad apparatus 10 is provided at a center of the armrest 9.

Figure 1A:
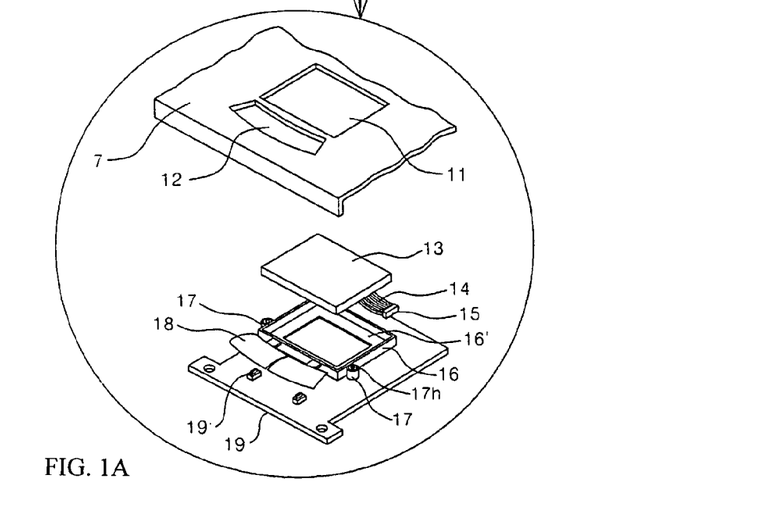
FIG. 1A is a detailed view of a portion of the related art portable computer of FIG. 1.

FIG. 1A is a detailed view of a portion of the related art portable computer of FIG. 1. As shown in FIG. 1A, the keydeck 7 is provided with a pad vent hole 11 and a button vent hole 12. The pad vent hole 11 is substantially in the shape of a quadrangle. The button vent hole 12 is formed in the keydeck 7 in front of the pad vent hole 11.

A touch pad 13 is seated in the pad vent hole 11 from below the keydeck 7. The touch pad 13 receives information regarding position, to which a user wishes to point, by sensing a touch of a user's finger. The touch pad 13 is provided with a cable 14 and a connector 15 in order to be electrically connected to other devices.

A touch pad housing 16 is provided in order to fix the touch pad 13 to the keydeck 7. The touch pad housing 16 is formed with a seating step 16', in which an edge of a lower surface of the touch pad 13 is seated.

The touch pad housing 16 is provided with fastening bosses 17 for mounting the touch pad housing 16 to the keydeck 7. Each of the fastening bosses 17 is formed with a fastening hole 17h through which a screw for fastening the touch pad housing 16 to the keydeck 7 passes.

A button 18 is provided at a position corresponding to the button vent hole 12 in a front end of the touch pad housing 16. The button 18 serves to select the position information input through the touch pad 13. A pad substrate 19 is provided with a variety of parts for operating the touch pad 13, such as a switch 19' and the like driven by the button 18.

However, the aforementioned related art portable computer has at least the following problems.

First, the touch pad housing 16 must be used in order to fasten the touch pad 13 to the keydeck 7 and position it in the pad vent hole 11. In addition, the pad substrate 19 additionally must be mounted under the touch pad housing 16. Thus, there is the problem that the main body 1 is relatively thick at a portion at which the touch pad 13 is provided. That is, a relatively large space for installing the touch pad apparatus 10 is required.

Further, if the touch pad apparatus 10 is installed within the front end of the main body 1, the inner space of the portable computer is small. Thus, there is the problem that parts for adding additional functions cannot be installed therein.

SUMMARY OF THE INVENTION

An object of the invention is to solve at least the above problems and/or disadvantages and to provide at least the advantages described hereinafter.

In order to achieve at least the above objects, in whole or in part, and in accordance with the purposes of the invention, as embodied and broadly described herein, there is provided a touch pad apparatus for a portable computer in accordance with an embodiment of the invention that includes a keyboard deck with a pad vent hole formed therethrough, a touch pad exposed through the pad vent hole, the touch pad receiving a signal from a user, a shield plate fastened to a bottom surface of the keyboard deck thus fixing the touch pad to the keyboard deck, the shield plate having a vent hole configured to be positioned beneath the touch pad, and a pad substrate fastened to the bottom surface of the keyboard deck, the pad substrate having a vent hole configured to be positioned beneath the touch pad and being provided with an element for operating the touch pad.

To further achieve at least the above objects, in whole or in part, and in accordance with the purposes of the invention, as embodied and broadly described herein, there is provided a touch pad apparatus for a portable computer in accordance with an embodiment of the invention that includes a keyboard deck with a pad vent hole formed therethrough, a touch pad exposed through the pad vent hole, the touch pad receiving a signal from a user, a shield plate fastened to a bottom surface of the keyboard deck thus fixing the touch pad to the keyboard deck, and a pad substrate fastened to the bottom surface of the keyboard deck, the pad substrate having a receiver for receiving a signal for remote control and being provided with an element for operating the touch pad.

To further to achieve at least the above objects, in whole or in part, and in accordance with the purposes of the invention, as embodied and broadly described herein, there is provided a portable computer in accordance with an embodiment of the invention that includes a main body having an external appearance defined by a keyboard deck and a bottom case, wherein a pad vent hole is formed through the keyboard deck and wherein the bottom case has a front surface in which a receiving window is formed, a touch pad exposed above the keyboard deck through the pad vent hole and configured to receive a signal from a user, a shield plate configured to be fastened to the bottom surface of the keyboard deck thus fixing the touch pad to be exposed through the pad vent hole, and a pad substrate fastened to the bottom surface of the keyboard deck, the pad substrate being provided with an element for operating the touch pad and a receiver for receiving a signal for remote control at a position corresponding to the receiving window.

To further achieve at least the above objects, in whole or in part, and in accordance with the purposes of the invention, as embodied and broadly described herein, there is provided a portable computer in accordance with an embodiment of the invention that includes a main body having an external appearance defined by a keyboard deck and a bottom case, wherein a button vent hole is formed through the keyboard deck and wherein the bottom case has a front surface in which a receiving window is formed, a button exposed through the button vent hole and configured to receive a signal from a user, and a pad substrate fastened to a bottom surface of the keyboard deck thus fixing the button leg of the button to the bottom surface of the keyboard deck, the pad substrate being provided with a receiver for receiving a signal for remote control at a position corresponding to the receiving window.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Now, a touch pad apparatus for a portable computer in accordance with embodiments of the invention will be described in detail with reference to the drawings, in which like reference numerals have been used to designate like elements.

Figure 2:
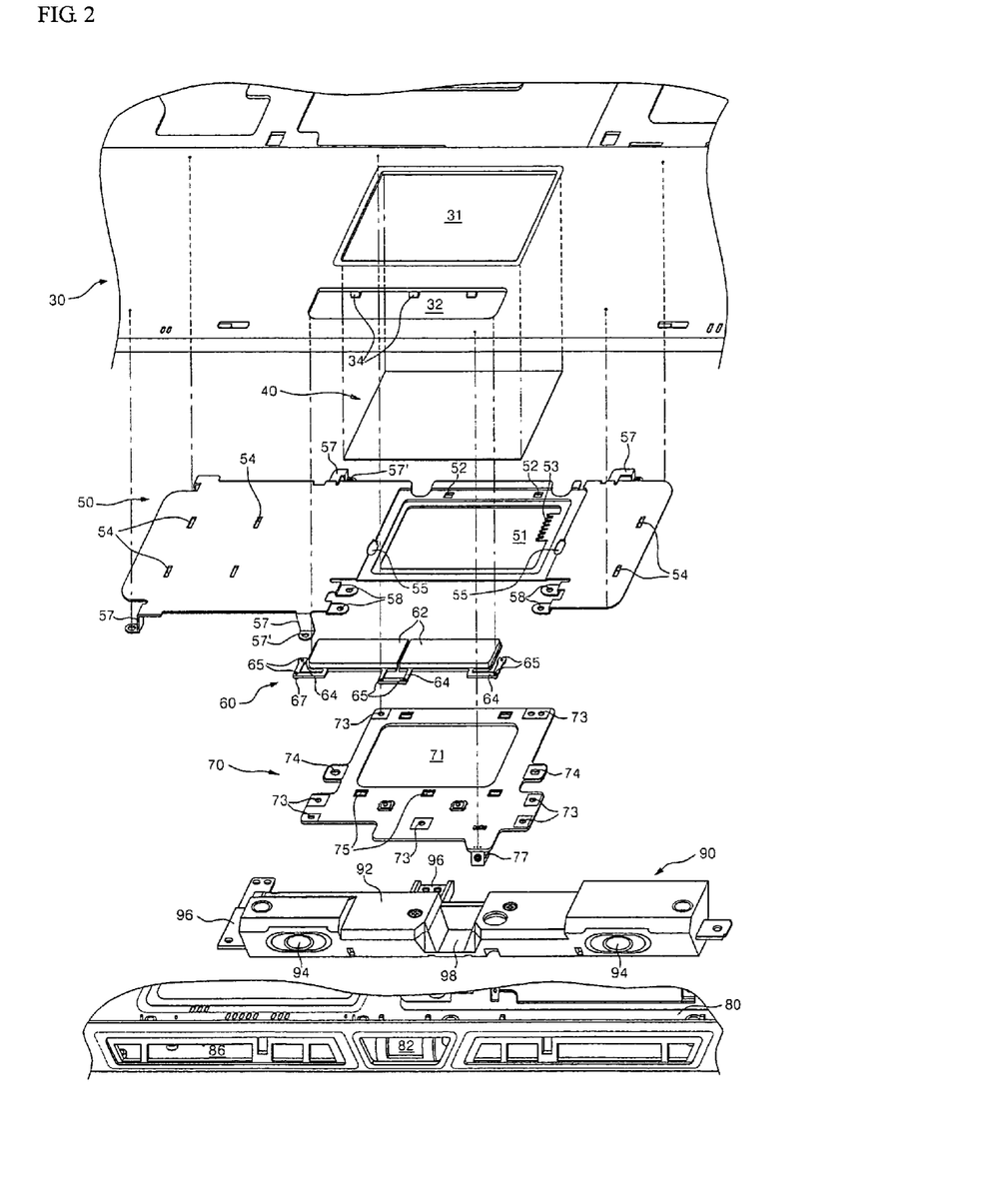
FIG. 2 is a schematic exploded perspective view of a touch pad apparatus for a portable computer according to an embodiment of the invention.
Figure 3:
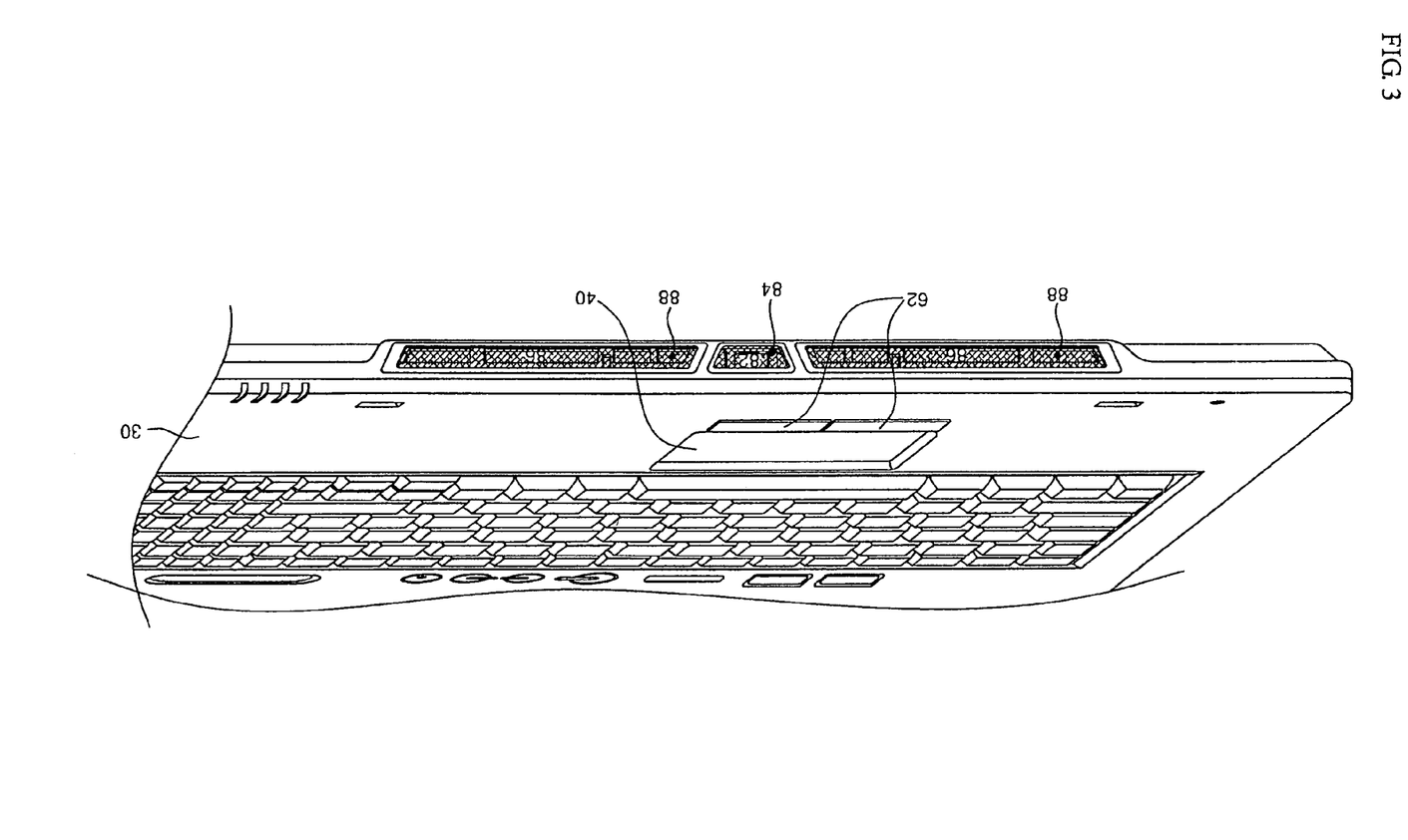
FIG. 3 is a schematic partial perspective view of the touch pad apparatus of FIG. 2.
Figure 4:
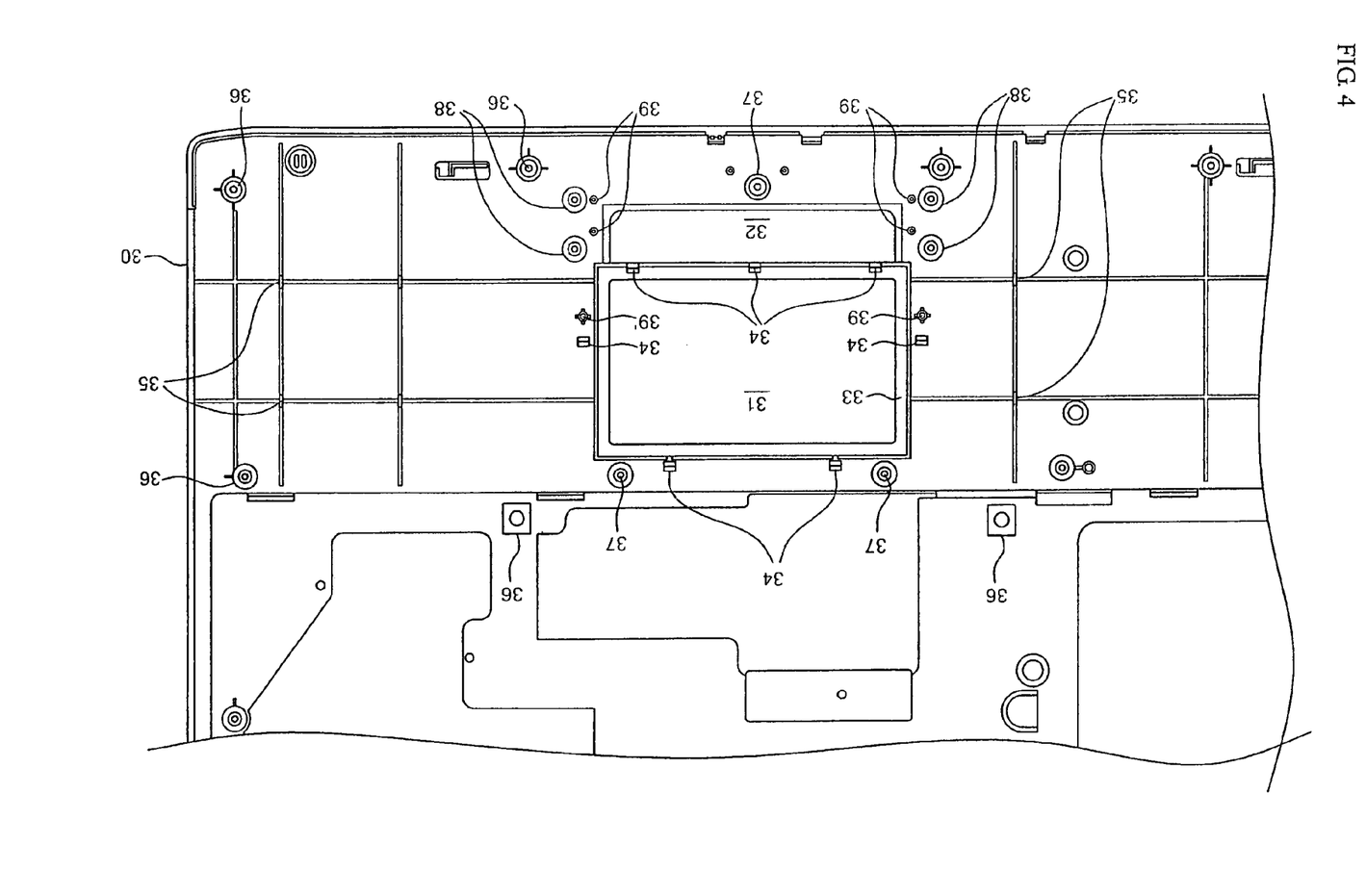
FIG. 4 is a schematic bottom view of a keyboard deck of the touch pad apparatus of FIG. 2.
Figure 5:
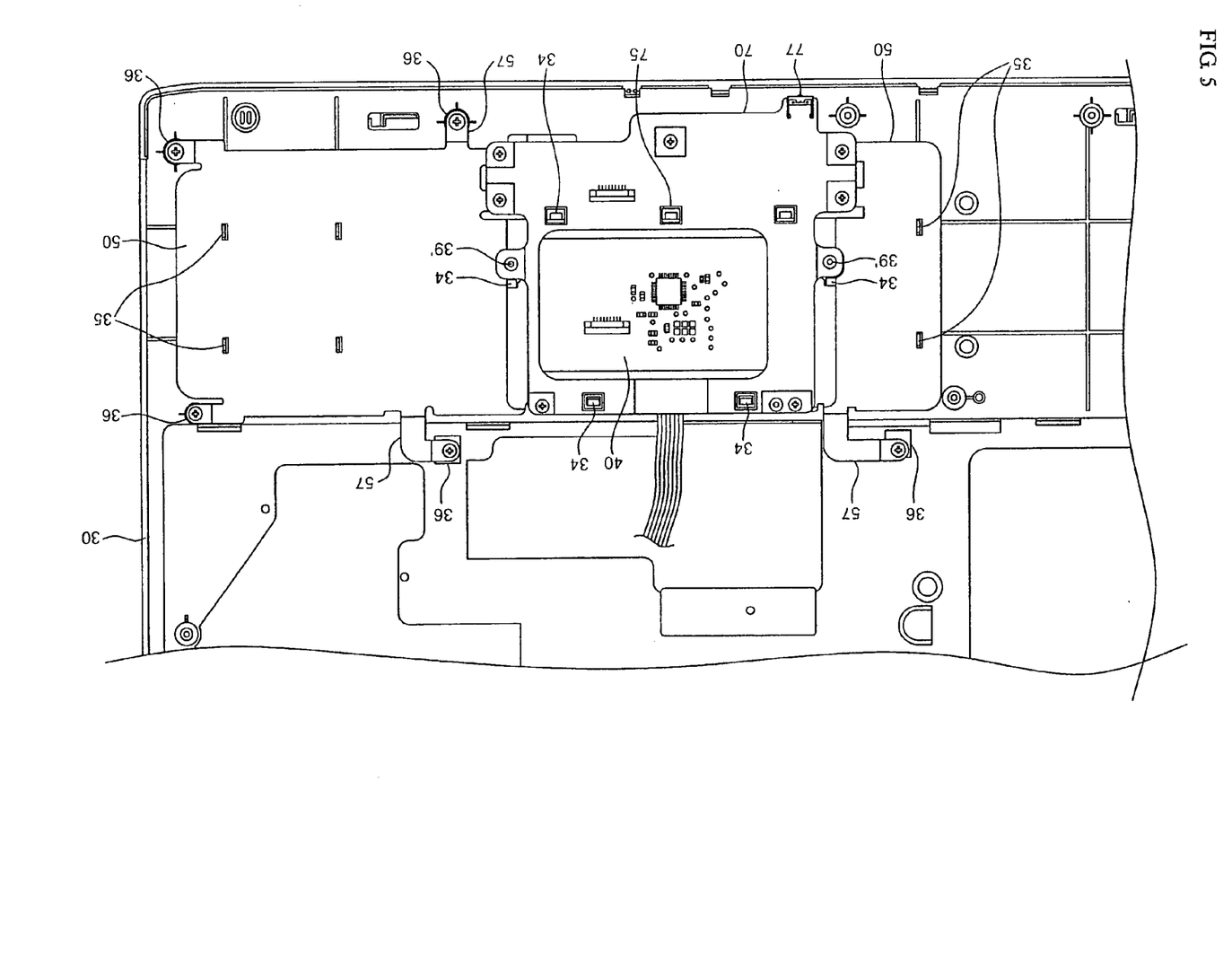
FIG. 5 is a schematic bottom view of the touch pad apparatus of FIG. 2.

FIG. 2 is a schematic exploded perspective view of a touch pad apparatus for a portable computer according to an embodiment of the invention. FIG. 3 is a schematic partial perspective view of the touch pad apparatus of FIG. 2. FIG. 4 is a schematic bottom view of a keyboard deck of the touch pad apparatus of FIG. 2. FIG. 5 is a schematic bottom view of the touch pad apparatus of FIG. 2.

As shown in FIGS. 2-5, a keyboard deck 30 defines an external appearance of an upper surface of a main body of a portable computer. A pad vent hole 31 may be formed through the keyboard deck 30 near a center of a front end thereof. The pad vent hole 31 may be in the shape of a rectangle. A button vent hole 32 may be formed through the keyboard deck 30 in front of the pad vent hole 31.

A pad seating step 33 may be formed on a bottom surface of the keyboard deck 30 corresponding to an edge of the pad vent hole 31. The pad seating step 33 may be formed so that an edge of the pad vent hole 31 is surrounded with a wall having a predetermined height. Catching protrusions 34 may be formed along an outside of the pad seating step 33. The catching protrusions 34 are portions on which a shield plate 50 may be caught. For example, in this embodiment, seven catching protrusions 34 are formed. A catching jaw may be provided on a distal end of each catching protrusion 34. In this embodiment, the catching jaw is provided opposite to the button vent hole 32. Some of the catching protrusions 34 may be formed on a wall defining the pad seating step 33 adjacent to the button vent hole 32.

The bottom surface of the keyboard deck 30 may be provided with guide ribs 35. The guide ribs 35 serve to guide an installation position of the shield plate 50, which will be described below. In this embodiment, the guide ribs 35 protrude in a long hexahedral shape.

The bottom surface of the keyboard deck 30 may include a plurality of plate fastening bosses 36. The plate fastening bosses 36 are portions to which the shield plate 50 is fastened, for example, by screws. The plate fastening bosses 36 may be provided along a front end of the bottom surface of the keyboard deck 30 and along portions where a keyboard is arranged. The plate fastening bosses 36, which may protrude below the keyboard deck 30, may protrude further than other ribs or protrusions. Further, the plate fastening bosses 36 may be provided with fastening holes for fastening, for example, screws.

Substrate fastening bosses 37 may be provided on a bottom surface of the keyboard deck 30 corresponding to edges of the pad vent hole 31 and the button vent hole 32. The substrate fastening bosses 37 may also be provided with fastening holes for fastening, for example, screws. In this embodiment, the substrate fastening bosses 37 are formed at both ends of a side of the button vent hole 31. That is, apart outward from the respective catching protrusions 34 by a predetermined distance, and at a position near the button vent hole 32 corresponding to a center of a front end of the bottom surface of the keyboard deck 30.

Composite fastening bosses 38 may be formed on the bottom surface of the keyboard deck 30 at positions corresponding to both side ends of the button vent hole 32. The composite fastening bosses 38 are portions to which the shield plate 50 and a pad substrate 70 may be simultaneously fastened by, for example, screws. In this embodiment, two composite fastening bosses 38 are formed at each of both side ends of the button vent hole 32, that is, four composite fastening bosses 38 are provided.

Button ribs 39 may be formed on the bottom surface of the keyboard deck 30 at positions corresponding to an edge of the button vent hole 32. The button ribs 39 guide an installation position of a button 60, which will be described below, and cause the button 60 to be temporarily assembled. In this embodiment, a pair of the button ribs 39 are provided at each of three portions of the edge of the button vent hole 32 except for a portion adjacent to the pad vent hole 31. In this embodiment, each of the button ribs 39 is in the shape of a circular cylinder; however, other shapes may also be appropriate.

A guide boss 39' may be provided at a position adjacent to each of the catching protrusions 34 provided at both side ends of the pad vent hole 31. The guide bosses 39' may protrude relatively more than the catching protrusions 34 and serve to simultaneously guide the seating of the shield plate 50 and the pad substrate 70 on the bottom surface of the keyboard deck 30.

An edge of a touch pad 40 may be seated in the pad seating step 33, so that the touch pad 40 is exposed above the keyboard deck 30 through the pad vent hole 31. With the touch pad 40 seated in the pad seating step 33, at least the edge of the touch pad 40 may be formed so as to protrude flush with the wall defined around the pad seating step 33. The touch pad 40 receives necessary information by allowing a user's finger to touch a surface of the touch pad 40 and move.

The shield plate 50 serves to fix the touch pad 40 and simultaneously provide ground and prevent leakage of electromagnetic waves. The shield plate 50 may be manufactured, for example, by pressing a metal plate. The shield plate 50 may be formed with a vent hole portion 51. The vent hole portion 51 may be formed at a position corresponding to the installation position of the touch pad 40. An area of the vent hole portion 51 may be smaller than that of the touch pad 40.

An edge of the vent hole portion 51 may be formed in a step shape so as to push an edge of a bottom surface of the touch pad 40. Thus, if the shield plate 50 is fastened to the bottom surface of the keyboard deck 30, the touch pad 40 is pushed by the shield plate 50 and does not float inadvertently.

The shield plate 50 may be formed with catching holes 52. The catching holes 52 may be formed in a portion of the edge of the vent hole portion 51, for example, at positions corresponding to the catching protrusions 34. The catching protrusions 34 formed between the button vent hole 32 and the pad vent hole 31 are caught to a portion of an edge of the shield plate 50 corresponding to a portion of the edge of the vent hole portion 51 of the shield plate 50. The catching hole 52 may have a cross sectional area relatively larger than that of the catching protrusion 34.

The shield plate 50 may be provided with a ground piece 53 which extends to an inside of the vent hole portion 51. The ground piece 53 may be electrically connected to a ground of the touch pad 40. The ground piece 53 may be configured to be somewhat elastically deformed when coming into contact with the touch pad 40.

The shield plate 50 may be formed with a plurality of guide slits 54. The guide slits 54 may be formed in shapes and at positions corresponding to the guide ribs 35 of the keyboard deck 30. The guide slits 54 and the guide ribs 35 serve to guide an installation position of the shield plate 50.

Composite guide holes 55 may be formed through the shield plate 50 at both side ends of the vent hole portion 51. Some of the catching protrusions 34 may be caught in the composite guide holes 55, and the guide bosses 39' pass through the composite guide holes 55.

Fastening legs 57 may be formed around the edge of the shield plate 50. Each of the fastening legs 57, which may be formed, for example, by bending a portion of the shield plate 50 several times, may be provided with a fastening hole 57'. The fastening legs 57 may be formed at positions corresponding to the plate fastening bosses 36.

The shield plate 50 may include composite fastening pieces 58 corresponding to the composite fastening bosses 38. Fastening holes, through which screws for fastening the composite fastening bosses 38 may pass, may be formed through the respective composite fastening pieces 58.

The button 60, which a user presses in order for necessary information to be input, may be partially exposed outside through the button vent hole 32. The button 60 may be provided with button bodies 62 exposed above an upper surface of the keyboard deck 30 through the button vent hole 32. Two button bodies 62 are provided in this embodiment.

The button bodies 62 may be provided with a plurality of button legs 64. The button legs 64, which may be seated on the bottom surface of the keyboard deck 30, may be configured to be elastically deformed by a user pushing the button bodies 62. Guide holes 65 may be formed through the respective button legs 64. The button ribs 39 are inserted into the guide holes 65, so that the installation position of the button 60 is guided. In this embodiment, a pair of the guide holes 65 are formed through each of the button legs 64. Pushed ribs 67 may be provided around edges of the respective guide holes 65. The pushed ribs 67, each of which may be formed in an annular shape, extend from the button legs 64. The button legs 64 may be fixed to the button ribs 39 by the pad substrate 70.

The pad substrate 70 is a portion in which a variety of parts of the touch pad apparatus are provided. The pad substrate 70 may be formed with a vent hole portion 71 corresponding to the vent hole portion 51 of the shield plate 50. A plurality of fastening holes 73 may be formed through the pad substrate 70. The fastening holes 73 may be formed at positions corresponding to the substrate fastening bosses 37 and the composite fastening bosses 38. In this embodiment, the fastening holes 73 and guide holes 74, which will be described below, are formed along an edge of the pad substrate 70. Screws may be fastened to the substrate fastening bosses 37 and the composite fastening bosses 38 through the fastening holes 73.

The guide holes 74 may be formed through the pad substrate 70 at positions corresponding to the guide bosses 39'. Distal ends of the guide bosses 39' may be seated in the guide holes 74, so as to guide an installation position of the pad substrate 70.

A plurality of protruding holes 75 may be formed through the pad substrate 70. The protruding holes 75 serve to prevent the catching protrusions 34 from interfering with the pad substrate 70. That is, when the pad substrate 70 is fastened to the keyboard deck 30, the pad substrate 70 does not come into close contact with the catching protrusions 34.

The pad substrate 70 may be provided with a receiver 77. The receiver 77 is a portion which receives signals for remote control. The receiver 77 may be mounted on the pad substrate 70 in a position corresponding to a front end of the keyboard deck 30. According to dimensions of a portable computer, for example, in a case where the pad substrate 70 is positioned considerably apart from the front end of the keyboard deck 30, the receiver 77 and the pad substrate 70 should be electrically connected to each other through an additional cable.

A bottom case 80 defines an external appearance of the main body of the portable computer in cooperation with the keyboard deck 30, with the bottom case 80 defining a bottom of the main body. A portion of the bottom case 80 defining a front surface of the main body may be formed with a receiving window 82. Optical signals for remote control may be transferred to the receiver 77 through the receiving window 82. The receiving window 82 may be mounted with a transparent or translucent shield member 84 through which light can be transmitted.

Speaker windows 86 may be formed in both side ends of the receiving window 82 in the bottom case 80. The speaker windows 86 may be provided with speaker grills 88 so that an interior of the bottom case 80 is not viewable from outside the device.

A speaker 90 may be provided in the bottom case 80 corresponding to portions in which the speaker windows 86 are formed. The speaker 90 may include a speaker case 92 defining an external appearance of the speaker 90 and speaker units 94 installed in the speaker case 92. The speaker units 94 may be installed at positions corresponding to the respective speaker windows 86, and thus partially exposed to an outside of the speaker case 92.

A plurality of fastening pieces 96 for fastening the speaker 90 to the bottom case 80 may be formed around an edge of the speaker case 92. A receiver seating portion 98 may be formed on the outside of the speaker case 92 at a position corresponding to the receiving window 82. The receiver seating portion 98 serves to prevent the speaker case 92 and the receiver 77 from interfering with each other. The receiver seating portion 98 may be formed to be open toward upper and front portions of the speaker case 92.

Hereinafter, the operation of the touch pad apparatus for a portable computer according to embodiments of the invention so constructed will be described in detail.

First, an assembly process of a touch pad apparatus according to an embodiment of the invention will be described. When assembling the touch pad apparatus, it is convenient to cause the bottom surface of the keyboard deck 30 to face in the direction of gravity by turning over the keyboard deck 30.

Next, the touch pad 40 is seated in the pad vent hole 31. That is, an edge of the touch pad 40 is seated in the pad seating step 33 formed on an edge of the pad vent hole 31.

After the touch pad 40 is seated in the pad vent hole 31, the shield plate 50 is seated on the keyboard deck 30. That is, guide ribs 35 are inserted into the guide slits 54, and guide bosses 39' are seated in composite guide holes 55. Then, catching protrusions 34 are caught into catching holes 52 and composite guide holes 55, and the portion of the edge of the shield plate 50 corresponding to the portion of the edge of the vent hole portion 51

In such a state, if the shield plate 50 moves somewhat in a direction opposite to a projecting direction of the catching jaws formed on the distal ends of the catching protrusions 34, the catching protrusions 34 are caught into the catching holes 52, the composite guide holes 55, and the portion of the edge of the shield plate 50. The edge of the vent hole portion 51 of the shield plate 50 pushes the edge of the touch pad 40, so that the touch pad 40 is not allowed to move inadvertently. Then, the fastening legs 57 and the plate fastening bosses 36 are fastened, for example, by screws.

Next, the button 60 is seated in the bottom surface of the keyboard deck 30. That is, the button ribs 39 of the keyboard deck 30 are inserted into the guide holes 65 of the button legs 64. The button bodies 62 are exposed above the keyboard deck 30 through the button vent hole 32.

Then, the pad substrate 70 is fastened to the bottom surface of the keyboard deck 30. The pad substrate 70 is seated on the keyboard deck 30, so that the guide bosses 39' are inserted into the guide holes 74 of the pad substrate 70. Then, the screws are fastened into the fastening holes 73. While some of the screws are directly fastened into the substrate fastening bosses 37 through the fastening holes 73, the others are fastened to the composite fastening bosses 38 through the composite fastening pieces 58 of the shield plate 50.

As the pad substrate 70 is fastened to the keyboard deck 30, the pushed ribs 67 of the button 60 are pushed by the pad substrate 70. Thus, the button legs 64 are fixed to the bottom surface of the keyboard deck 30 by the pad substrate 70, thus causing the button bodies 62 to float in the button vent hole 32 to some extent. Such a state where a touch pad apparatus according to an embodiment of the invention is mounted to the keyboard deck 30, as described above, is shown in FIG. 5.

Next, the bottom case 80 is mounted with the speaker 90. The speaker 90 is fixed by causing the fastening pieces 96 of the speaker case 92 to be fastened to the bottom case 80 by, for example, screws. If the speaker 90 is fastened to the bottom case 80, the speaker units 94 are positioned at the positions corresponding to the speaker windows 86 and the receiver seating portion 98 is positioned at the position corresponding to the receiving window 82.

In the meantime, if the keyboard deck 30 and the bottom case 80 are fastened to each other while the pad substrate 70 is fastened to the keyboard deck 30, the receiver 77 is seated on the receiver seating portion 98 of the speaker case 92. In such a case, the receiver 77 may receive signals through the receiving window 82 of the bottom case 80.

Since the receiver 77 is mounted to the pad substrate 70 without using an additional substrate or connected to the pad substrate 70 with an additional cable, it is possible to easily apply a remote control function to the portable computer.

A touch pad apparatus for a portable computer constructed in accordance with embodiments of the invention has at least the following advantages.

A touch pad apparatus according to embodiments of the invention is light, slim, simple, and compact. Further, a touch pad apparatus according to embodiments of the invention is easily installed in a portable computer. Also, a touch pad apparatus according to embodiments of the invention is provided to which a remote control function is added and parts for a remote control function added to a touch pad apparatus may easily be installed.

Since the touch pad and the button can be fixed to the keyboard deck by mounting the shield plate and the pad substrate, the overall configuration of the touch pad apparatus can be light, slim, simple, and compact. Thus, there is the advantage that it is possible to effectively use the inner space of a portable computer.

Further, since the pad substrate is provided with a receiver for receiving remote control signals, an additional substrate for the receiver is not necessary. Therefore, even where the inner space of the main body of the portable computer is effectively used, it is possible to apply the remote control function to the portable computer.

In addition, the touch pad apparatus accordance to embodiments of the invention is completely assembled by fastening the shield plate and the pad substrate to the keyboard deck with the touch pad and the button being seated on the keyboard deck. Thus, there is the advantage that the touch pad apparatus is easily installed in a portable computer.

Further, the fixation and grounding of the touch pad are simultaneously performed by using the shield plate. Thus, there is the advantage that the portable computer is more smoothly grounded and the performance of electromagnetic interference shielding is improved.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A touch pad apparatus for a portable computer, comprising:
   a keyboard deck having a pad vent hole formed therethrough;
   a touch pad exposed through the pad vent hole, the touch pad to receive a signal from a user;
   a shield plate fastened to a bottom surface of the keyboard deck such that the touch pad is fixed to the keyboard deck, the shield plate having a vent hole positioned beneath the touch pad; and
   a pad substrate fastened to the bottom surface of the keyboard deck, the pad substrate having a vent hole positioned beneath the touch pad and the pad substrate including an element for operating the touch pad.

2. The touch pad apparatus as claimed in claim 1, wherein the bottom surface of the keyboard deck includes a pad seating step corresponding to an edge of the pad vent hole, and the touch pad is exposed above a top surface of the keyboard deck through the pad vent hole by seating an edge of the touch pad in the pad seating step.

3. The touch pad apparatus as claimed in claim 1, wherein the shield plate is made of a metal for grounding the touch pad.

4. The touch pad apparatus as claimed in claim 1, further comprising a button vent hole formed in the keyboard deck and a button including a button leg installed to the bottom surface of the keyboard deck and a button body formed integrally with the button leg, wherein the button body is exposed above the keyboard deck through the button vent hole and wherein the pad substrate fixes the button leg of the button to the bottom surface of the keyboard deck.

5. The touch pad apparatus as claimed in claim 4, wherein a guide hole, into which a button rib formed on the bottom surface of the keyboard deck is inserted, is formed in the button leg, and a pushed rib, which is in close contact with a surface of the pad substrate, is formed around an edge of the guide hole.

6. The touch pad apparatus as claimed in claim 4, wherein the shield plate comprises a second vent portion for receiving the button.

7. The touch pad apparatus as claimed in claim 6, wherein the shield plate includes fastening pieces formed along an edge of the second vent portion and having fastening holes formed therein corresponding to fastening holes formed on the button and the pad substrate.

8. The touch pad apparatus as claimed in claim 1, wherein the pad substrate is provided with a receiver for receiving a signal for remote control, the receiver being installed at a receiving window formed in a bottom case of a portable computer, the bottom case and the keyboard deck defining an external appearance of the portable computer.

9. The touch pad apparatus as claimed in claim 5, wherein the receiving window is positioned in a center of a front surface of a main body of the portable computer defined by the keyboard deck and the bottom case, and both side ends of the receiving window are provided with speaker windows, the speaker windows being provided with speaker grills behind which speaker units of a speaker positioned in the keyboard deck and the bottom case are placed.

10. The touch pad apparatus as claimed in claim 9, further comprising a speaker case of the speaker, wherein a center of the speaker case is formed with a receiver seating portion in which the receiver is configured to be positioned.

11. The touch pad apparatus as claimed in claim 1, wherein an edge of the vent hole of the shield plate is formed to correspond to an edge of the touch pad, and a side of the vent hole of the shield plate is provided with a ground piece for connecting with a ground portion of the touch pad.

12. The touch pad apparatus as claimed in claim 11, wherein a plurality of catching protrusions are provided around an edge of the pad vent hole of the keyboard deck, the catching protrusions to catch the shield plate such that the shield plate is temporarily assembled to the keyboard deck.

13. The touch pad apparatus as claimed in claim 11, wherein the shield plate is provided with a plurality of fastening legs and fastening pieces to be fastened to the keyboard deck by screws.

14. The touch pad apparatus as claimed in claim 13, wherein the shield plate and the keyboard deck are formed with a guide slit and a guide rib, respectively, at corresponding positions to facilitate installation.

15. The touch pad apparatus as claimed in claim 14, wherein the pad substrate is formed with a plurality of fastening holes and guide holes around an edge of the pad substrate.

16. The touch pad apparatus as claimed in claim 15, wherein protruding holes corresponding to the catching protrusions of the keyboard deck are formed through the pad substrate to prevent the catching protrusions and the pad substrate from interfering with each other.

17. The touch pad apparatus as claimed in claim 13, wherein the pad substrate and the shield plate are fastened to the keyboard deck at respective positions corresponding to the fastening pieces by the screws.

18. A portable computer comprising the touch pad apparatus of claim 1.

19. A touch pad apparatus for a portable computer, comprising:
a keyboard deck having a pad vent hole formed therethrough;
a touch pad exposed through the pad vent hole, the touch pad to receive a signal from a user;
a shield plate fastened to a bottom surface of the keyboard deck to fix the touch pad to the keyboard deck; and
a pad substrate fastened to the bottom surface of the keyboard deck, the pad substrate having a receiver for receiving a signal for remote control and being provided with an element for operating the touch pad.

20. A portable computer comprising the touch pad apparatus of claim 19.

21. A portable computer, comprising:
a main body having an external appearance defined by a keyboard deck and a bottom case, wherein a pad vent hole is formed through the keyboard deck and the bottom case has a front surface in which a receiving window is formed;
a touch pad exposed through the pad vent hole to receive a signal from a user;
a shield plate to be fastened to a bottom surface of the keyboard deck such that the touch pad is exposed through the pad vent hole; and
a pad substrate fastened to the bottom surface of the keyboard deck, the pad substrate being provided with an element for operating the touch pad and a receiver for receiving a signal for remote control at a position corresponding to the receiving window.

22. The portable computer as claimed in claim 21, wherein the shield plate is made of a metal for grounding the touch pad.

23. The portable computer as claimed in claim 21, wherein the keyboard deck comprises a button vent hole and the portable computer further comprises a button including a button leg installed to the bottom surface of the keyboard deck and a button body formed integrally with the button leg, the button body being exposed above the keyboard deck through the button vent hole.

24. The portable computer as claimed in claim 21, wherein the receiving window is positioned in a center of a front surface of the main body, and both side ends of the receiving window are provided with speaker windows, the speaker windows being provided with speaker grills behind which speaker units of a speaker positioned in the keyboard deck and the bottom case are placed.

25. A portable computer, comprising:
a main body having an external appearance defined by a keyboard deck and a bottom case, wherein a button vent hole is formed through the keyboard deck and the bottom case has a front surface in which a receiving window is formed;
a button exposed through the button vent hole to receive a signal from a user; and
a pad substrate fastened to a bottom surface of the keyboard deck such that the button leg of the button is fixed to the bottom surface of the keyboard deck, the pad substrate being provided with a receiver for receiving a signal for remote control at a position corresponding to the receiving window.

26. The portable computer as claimed in claim 25, wherein the receiving window is positioned in a center of a front surface of the main body, and both side ends of the receiving window are provided with speaker windows, the speaker windows being provided with speaker grills behind which speaker units of a speaker positioned in the keyboard deck and the bottom case are placed.

27. The portable computer as claimed in claim 25, wherein a center of a speaker case housing the speaker units is formed with a receiver seating portion in which the receiver is configured to be positioned.

* * * * *